United States Patent [19]

Wirges et al.

[11] Patent Number: 4,632,371
[45] Date of Patent: Dec. 30, 1986

[54] GAS SPRING OF VARIABLE SPRING FORCE

[75] Inventors: Winfried Wirges, Koblenz; Leo Lauderbach, Steinbach; Willi Schäfer, Koblenz, all of Fed. Rep. of Germany

[73] Assignee: Stabilus GmbH, Fed. Rep. of Germany

[21] Appl. No.: 712,977

[22] Filed: Mar. 18, 1985

[30] Foreign Application Priority Data

Mar. 21, 1984 [DE] Fed. Rep. of Germany ....... 3410309

[51] Int. Cl.⁴ ............................................. F16F 9/14
[52] U.S. Cl. ............................ 267/64.28; 188/322.21; 267/64.22; 272/114
[58] Field of Search ................ 188/322.21; 267/64.13, 267/64.15, 64.18, 64.22, 64.24, 64.28, 124, 126, 127; 272/114

[56] References Cited

U.S. PATENT DOCUMENTS 2,865,633 12/1958 Woodall .............................. 272/114
3,351,342 11/1967 Guin .................................... 272/114

FOREIGN PATENT DOCUMENTS

| | | |
|---|---|---|
| 1264879 | 10/1968 | Fed. Rep. of Germany . |
| 1282364 | 7/1969 | Fed. Rep. of Germany . |
| 2704170 | 8/1978 | Fed. Rep. of Germany . |
| 0001281 | 1/1977 | Japan ................................ 267/64.28 |
| 0050474 | 4/1977 | Japan ................................ 267/64.28 |
| 632497 | 11/1949 | United Kingdom . |
| 852889 | 11/1960 | United Kingdom . |
| 1006192 | 9/1965 | United Kingdom . |
| 1366896 | 9/1974 | United Kingdom . |
| 1471687 | 4/1977 | United Kingdom . |
| 1510028 | 5/1978 | United Kingdom . |

*Primary Examiner*—Duane A. Reger
*Attorney, Agent, or Firm*—Brumbaugh, Graves, Donohue & Raymond

[57] ABSTRACT

A gas spring particularly for jumping stilts comprises a working cylinder and a plunger. In the working cylinder there is a working chamber containing a mass of gas. A gas exchange chamber is fixed with respect to the working cylinder. An exchange passage connects the working chamber and the gas exchange chamber. A gas exchange valve is provided in the exchange passage. An exchange operating handle is provided separate from the plunger.

11 Claims, 5 Drawing Figures

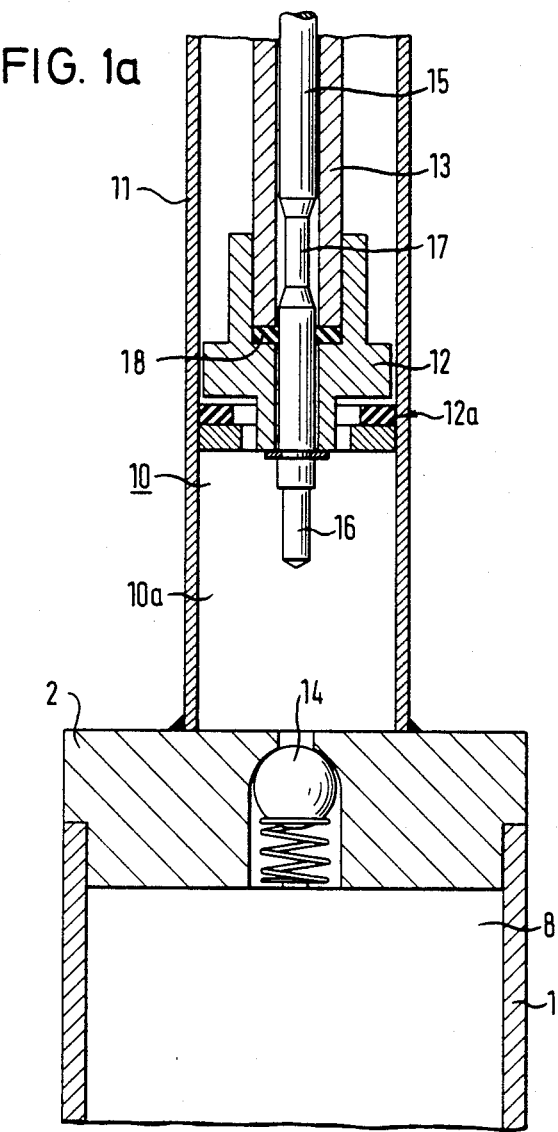

GAS SPRING OF VARIABLE SPRING FORCE

BACKGROUND OF THE INVENTION

This invention relates to a gas spring of variable force. Gas springs are e.g. used in so-called jumping stilts. In jumping stilts the spring force of the gas spring must be adapted to the weight and to the skilfulness of the user. This invention provides means for varying the spring force of such gas springs.

STATEMENT OF THE PRIOR ART

For the adaptation of the outward thrust force of a gas spring it is known from German Patent Specification No. 1,264,879 to connect the working chamber of a gas spring with atmosphere as from a predetermined outward travel against the force of a helical compression spring. In this way the outward thrust force of the gas spring can be reduced. This German Patent further shows that in view of increasing the outward thrust force of a gas spring a reservoir with gas filling under high pressure can be arranged in the cavity of the gas spring and can be connected through a gas exchange valve with the working chamber of the gas spring; this exchange valve is actuatable by a portion of the plunger, namely a working piston connected with a working piston rod. It is disadvantageous in these embodiments that the variation of the outward thrust force of the gas spring is possible only in specific positions of the working piston.

Furthermore, it is known from German Patent Specification No. 1,282,364 to provide a reservoir under higher pressure for adaptation of the gas spring to the desired outward thrust. This reservoir is connectable with the working chamber on the one hand through a first exchange valve by the piston movement, so that when the valve is pushed open by the inwardly moving working piston pressure medium flows out of the reservoir into the working chamber and thus the outward thrust force is increased. A second exchange valve connects a pump chamber on the piston rod side of the working piston with the reservoir, so that when the piston rod is in the nearly fully extended position, on further outward movement of the piston rod pressure medium is pumped against the force of a spring out of the pump chamber into the reservoir and thus the outward thrust force of the gas spring is reduced. It is disadvantageous in this construction that unskilled operation of the gas spring, that is pushing in or pulling out of the working piston rod too far, can result in an unintended variation of outward thrust force.

The arrangement of a gas spring of variable force in a stilt or pogo stick is known from German 'Offenlegungsschrift' No. 2,704,170. An exchange valve is provided in the working cylinder of the gas spring which renders possible either letting off of the pressure in the working chamber or pumping up. It is disadvantageous in this construction that the letting off of pressure cannot be effected in a finely sensitive manner and a separate pump is necessary for increasing the pressure. Exact adjustment of the support force to the desired value can be carried out only with difficulty and requires great skill of the operator, in the case of this gas spring construction.

OBJECT OF THE INVENTION

It is the object of the present invention to avoid the disadvantages of the known constructions and to provide a gas spring of variable force, the outward thrust force of which can be adapted exactly and without difficulty to the required loading. The gas spring should be simple in assembling and guarantee high reliability of operation even if the piston stroke is fully used.

SUMMARY OF THE INVENTION

In view of the above mentioned object a gas spring comprises a working cylinder having an axis and defining a cavity therein. A plunger member extends inwardly and outwardly of the cavity and defines a first working chamber within the cavity. The plunger member is axially movable with respect to the working cylinder inwardly and outwardly of the cavity. A mass of gas is provided within the first working chamber. The pressure of the gas is responsive to the axial position of the plunger member with respect to the working cylinder. Gas exchange means are provided for selectively increasing and decreasing the mass of gas contained within the first working chamber. The gas exchange means comprise a gas exchange chamber fixed with respect to the working cylinder. Exchange passage means extend between the first working chamber and the gas exchange chamber. Exchange valve means are provided within the exchange passage means. Exchange operating means are provided which are separate from the plunger member.

This arrangement and actuation of the gas exchange valve guarantee high functional reliability of the gas spring with full exploitation of the piston stroke, since no undesired variation of the outward thrust force can occur as a result of excessive inward or outward movement of the working piston rod. The gas spring itself is very simple in assembly and can easily be adapted to the required loading. The variation of force can here be effected without a separate air pump.

The plunger member may comprise a working piston rod sealingly guided by piston rod sealing and guiding means adjacent one end of the working cylinder and a working piston at the inner end of the working piston rod. The working piston rod defines one end of the first working chamber. A second working chamber is defined around the working piston rod axially between the working piston and the piston rod guiding and sealing means. Working piston valve means of the check-valve type may be provided between the first working chamber and the second working chamber. These working piston valve means are closed in response to the pressure of gas within the first working chamber exceeding the pressure of gas within the second working chamber. By these constructional features the functional reliability of the gas spring is increased since the guiding and sealing means are provided such that slight leakages between the working piston and the working cylinder during operation of the gas spring do not lead to any loss of gas and thus the support force is maintained. This results essentially from the fact that any leakage losses between the working piston and the working cylinder occurring and through the working piston valve means are returned from the second working chamber into the first working chamber on outward movement of the working piston rod.

According to a first preferred embodiment of the invention the gas exchange chamber accommodates a pumping piston movable between an innermost position adjacent the first working chamber and an outermost position remote from the first working chamber. The pumping piston defines a pumping chamber within the gas exchange chamber. This pumping chamber is adjacent the exchange valve means. The pumping piston is provided with suction valve means permitting aspiration of air into the pumping chamber on outward movement of the pumping piston and closing said pumping chamber on inward movement of the pumping piston. The exchange valve means are of the check-valve type and are closed in response to the pressure within the first working chamber exceeding the pressure within the pumping chamber. On the other hand, the exchange valve means are opened in response to the pressure within the pumping chamber exceeding the pressure within the first working chamber. The pumping piston is provided with a pump operating member outside the gas exchange chamber and with an exchange valve actuating pin opening said exchange valve means when the pumping piston is in or adjacent its innermost position. The pumping piston comprises manually operable bleed valve means for connecting the pumping chamber with atmosphere. This results in a very compact construction. The pumping chamber may be defined within a pumping cylinder fixed to one end wall of the working cylinder. In this preferred construction the bleed valve means may comprise a bleed valve member which is connected for common movement with the exchange valve actuating pin with respect to the pumping piston. The bleed valve member is manually movable by a bleed valve operating member from a first closing position to a second closing position through an open position and is biased towards the first closing position. The exchange valve actuating pin opens the exchange valve means when the bleed valve means is in the second closing position. This embodiment allows letting off of the gas out of the gas spring by small portions, on the one hand and a finely sensitive feed of pressure medium into the first working chamber, on the other hand.

According to another preferred embodiment of the invention the gas exchange chamber is a gas reservoir.

The gas spring of the invention can be easily accommodated within a stilt e.g. a pogo stick. The gas exchange is easily possible while the gas spring remains in its operative location within the stilt.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated preferred embodiments of the invention.

BRIEF DESCRIPTION OF THE DRAWINGS

The invention will be explained in greater detail below by reference to the forms of embodiment represented in the drawings. In detail:

FIG. 1a shows a detail of FIG. 1;

DETAIL DESCRIPTION OF THE DRAWING

Figure 1:
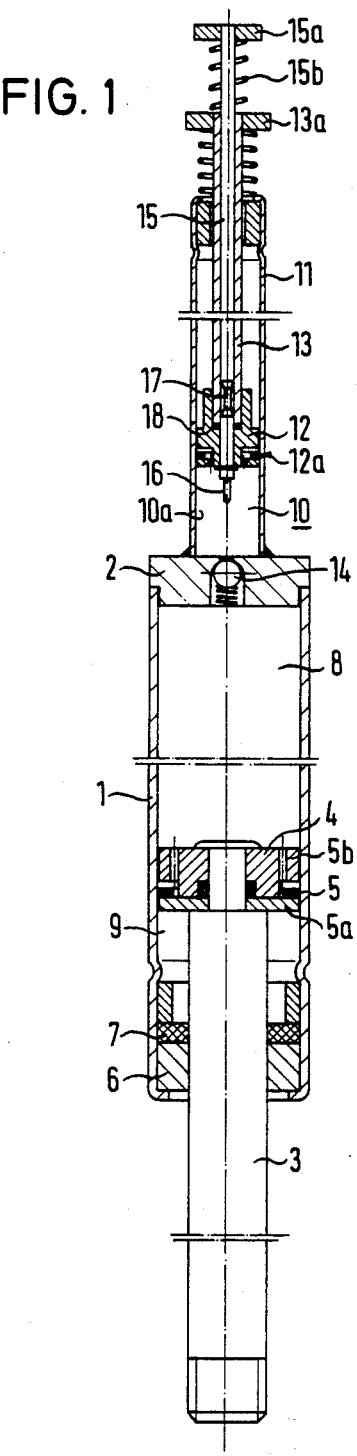
FIG. 1 shows a gas spring of variable force in longitudinal section in which a pumping chamber is arranged outside the working cylinder.

The gas spring of variable force according to FIG. 1 consists of a working cylinder 1 which is closed at one end by an end wall 2 and at the other end comprises a piston rod guiding and sealing unit 6, 7. A working piston 4 sliding on the inner wall of the working cylinder 1 is connected with a working piston rod passing through the guiding and sealing unit 6, 7. The working piston 4 divides the cavity within the working cylinder 1 into a first working chamber 8 and a second working chamber 9, both working chambers 8, 9 being filled with gas. A gas exchange chamber 10 is arranged outside the working cylinder 1 within a pumping cylinder 11 connected with the end wall 2. A pumping piston 12 is provided within the gas exchange chamber 10 and defines a pumping chamber 10a therein. The pumping piston 12 is secured on a pumping piston rod 13 which is of tubular formation and carries a pump operating member 13a. The pumping piston 12 is provided with a suction valve 12a. In the interior of the pumping piston rod 13 there is an operating rod 15 with a bleed valve operating member 15a. The operating rod 15 is provided with an extension piece or valve actuating pin 16 at the lower end. Furthermore, the operating rod 15 has a section 17 of smaller diameter which cooperates with a sealing ring 18 clamped in between the end face of the pumping piston rod 13 and the pumping piston 12. The section 17 and the sealing ring 18 define a bleed valve 17, 18. The first working chamber 8 is connectable with the pumping chamber 10a through a non-return valve or check valve 14 arranged in the end wall 2.

On movement of the working piston rod 3 inwards of the working cylinder 1 the piston ring 5, arranged in a groove of the working piston 4 and axially movable therein, places itself against the piston disc 5a and thus sealingly separates the first working chamber 8 from the second working chamber 9. On pulling the working piston rod 3 out of the working cylinder 1 the piston ring 5 forming the working piston valve 5 places itself against the working piston member 5b and clears the passage of gas between the working chambers 8 and 9. Thus a gas pressure can build up in the second working chamber 9 which, the more the working piston rod 3 moves outwards, forms a compressed gas cushon and thus damps the outward movement of the piston rod 3.

If an increase of the support force of the gas spring according to FIG. 1 becomes necessary, this is obtained by a pumping movement of the pumping piston 12. By pushing down of the pumping piston rod 13 the pumping piston 12 moves downwards; the pumping chamber 10a is sealed off to the atmosphere by the suction valve 12a. Due to the excess pressure occurring in the pumping chamber 10a compared with the pressure in the first working chamber 8 the check valve 14 is opened and the air can flow from the pumping chamber 10a into the first working chamber 8. This pumping movement is continued until the pressure in the first working chamber 8 has risen so far that the desired supporting force on the working piston rod 3 is achieved.

If the supporting force on the working piston rod 3 is to be reduced, the operating rod 15 is displaced downwards axially in the pumping piston rod 13 and the section 17 of smaller diameter travels from its first closing position as illustrated in FIG. 1 through an opening position to a second closing position beyond the sealing ring 18. This may occur in a predetermined position of the pumping piston 12 which may be defined by an abutment member (not shown). The check valve 14 is pushed by the extension piece 16 of the operating rod 15, so that gas can flow out of the first working chamber 8 into the pumping chamber 10. Now the operating rod 15 is released, whereby it is returned into the first closing position as a result of the force of the return spring 15b and the gas force, the section 17 of smaller diameter passing over the sealing ring 18. The gas filling situated in the pumping chamber 10 therefore flows away to atmosphere through the bore in the pumping piston rod 13. This operation renders possible letting off of compressed gas by portions from the first working chamber 8. It is repeated until the desired outward thrust force of the piston rod is set.

Figure 2:
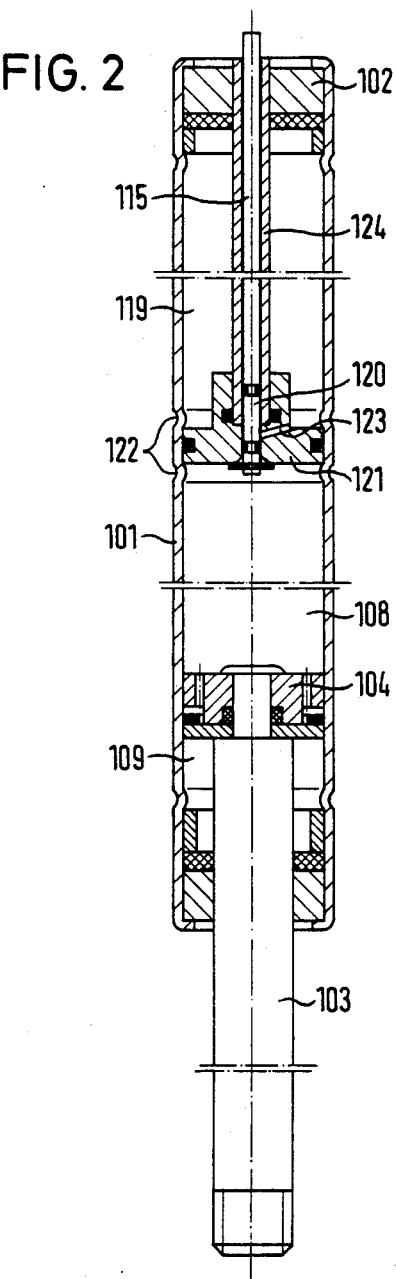
FIG. 2 shows a gas spring of variable force with a gas exchange chamber arranged within the working cylinder.

In the form of embodiment of a gas spring of variable force as represented in FIG. 2, an exchange chamber 119 is arranged in the interior of the working cylinder 101 and has no connection to the atmosphere. This exchange chamber 119 is separated from the first working chamber 108 by a separating piston 121 made fast in the working cylinder 101 by means of corrugations 122. A valve body 120 of an exchange valve with an operating pin 115 is provided in the separating piston 121 and can open and close an exchange passage 123. The operating pin 115 is in this case axially displaceable in the bore of a separating piston rod 124 penetrating the end wall 102 and connected with the separating piston 121 and is sealed off to the atomosphere therein. The highest support force achievable with this form of embodiment is determined by the filling pressure in the first working chamber 108 which is obtained when the exchange valve 120 is opened with the working piston 104 being in its outermost position and when the exchange valve 120 is thereafter closed. If a lower supporting force on the working piston rod 103 is desired, the exchange valve 120 is opened by means of the operating pin 115, whereby the exchange chamber 119 is connected through the exchange passage 123 with the first working chamber 108 and the working piston rod 103 is pushed into the working cylinder 101 so that the filling medium is forced out of the first working chamber 108 into the exchange chamber 119 whereupon the exchange passage 123 is closed again. This forcing of gas out of the working chamber 108 into the exchange chamber 119 has the effect that the mean pressure in the working chambers 108 and 109 decreases and thus a lower support force is set on the piston rod.

Figure 3:
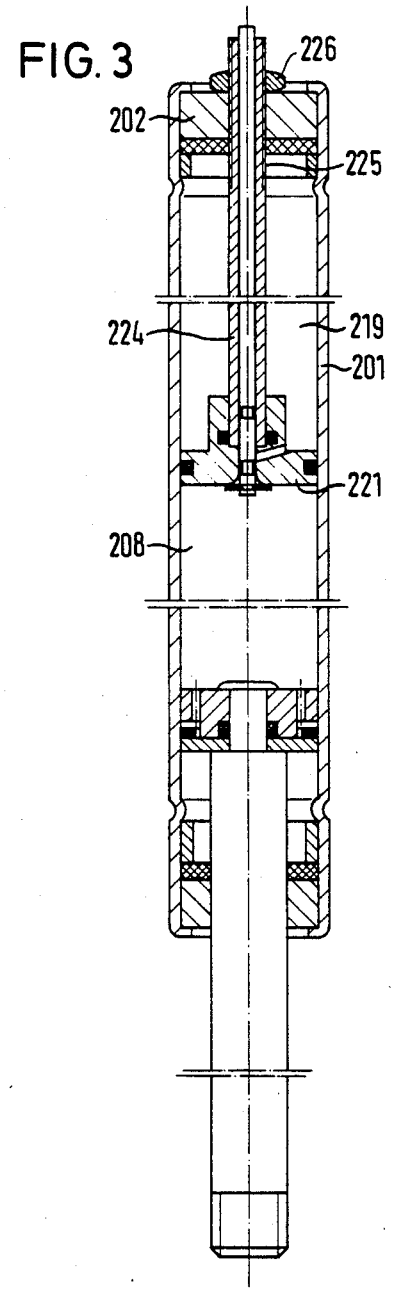
FIG. 3 shows a form of embodiment of a gas spring of variable force in which a separator piston is arranged between the working chamber and the gas exchange chamber and this separating piston is axially adjustable.

The form of embodiment according to FIG. 3 differs from that according to FIG. 2 essentially in that the separating piston 221 is arranged in the working cylinder 201 axially displaceably by means of the separating piston rod 224 connected therewith. The separating piston rod 224 has at its upper end a securing device consisting essentially of a threading 225 which comes to engage in a corresponding counter-threading of the end wall 202. When the desired position of the separating piston 221 is reached, this position is fixed by means of a lock nut 226. The adjustable separating piston 221 provides the possibility of varying the volume of the first working chamber 208, the exchange chamber 219 diminishing correspondingly. This measure provides a further possibility of pressure regulation.

Figure 4:
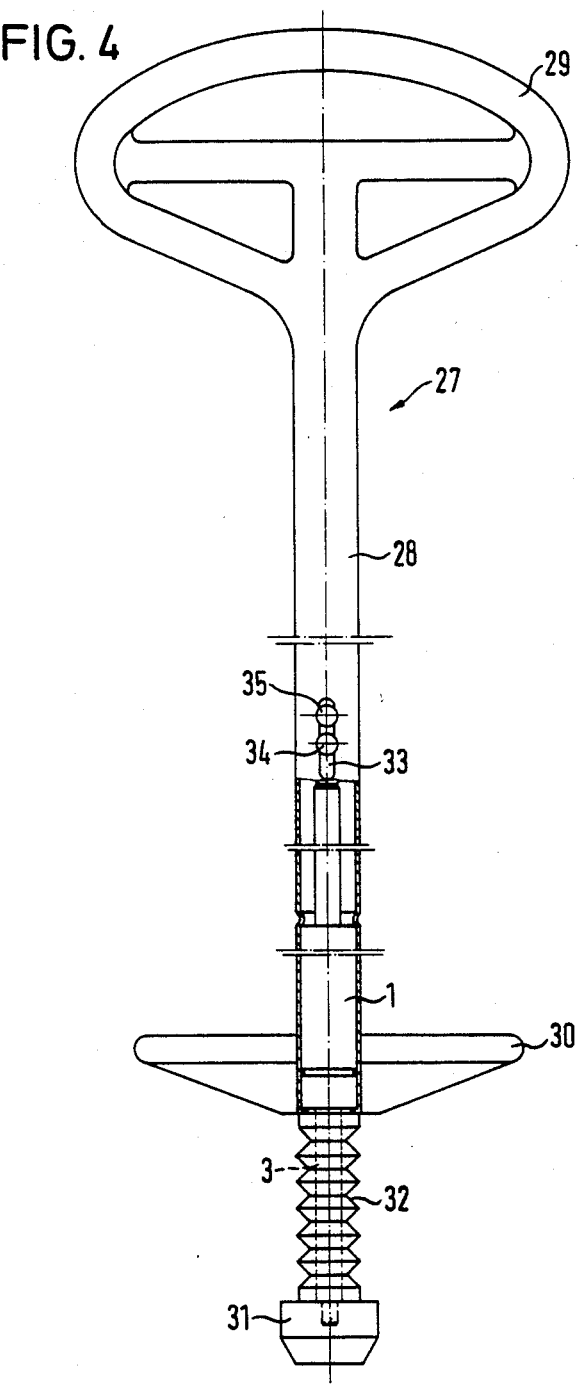
FIG. 4 shows the arrangement of a gas spring of variable force in a pogo stick.

In FIG. 4 there is shown an arrangement of a gas spring of variable force in a pogo stick 27. This pogo stick 27 has a tube part 28 in which the working cylinder 1 of the gas spring according to FIG. 1 is secured.

At one end of the tube part 28 of the pogo stick 27 there is provided a handle part 29, while a foot rest 30 is secured to the lower end. The piston rod 3 of the gas spring protrudes at the lower end from the tube part 29 of the pogo stick 27 and is provided at its free end with an elastic, slipproof bugger 31. To protect the piston rod 3 a bellowsfold element 32 is situated between the buffer 31 and the lower end of the tube part 28. An actuating lever 34 connected with the separating member 13a and an actuating lever 35 connected with the operating member 15a are conducted to the exterior through an aperture 33 in the tube part 28. Specifically in such pogo sticks it is necessary that the support force of the gas spring should be easily adaptable to the weight of the user. This is effected through the actuating levers 34 and 35 in the manner as described in the form of embodiment according to FIG. 1.

While a specific embodiment of the invention has been shown and described in detail to illustrate the application of the inventive principles, it will be understood that the invention may be embodied otherwise without departing from such principles.

It is to be understood that the reference numbers in the claims are only for better understanding and are by no means restrictive.

What is claimed is:

1. A gas spring comprising a working cylinder (1) having an axis and defining a cavity (8, 9) therein;

a plunger member (3, 4) extending inwardly and outwardly of said cavity (8, 9) and defining a first working chamber (8) within said cavity (8, 9), said plunger member (3, 4) being axially movable with respect to said working cylinder (1) inwardly and outwardly of said cavity (8, 9);

a mass of gas within saids first working chamber (8), the pressure of said gas being responsive to the axial position of said plunger member (3, 4) with respect to said working cylinder (1);

gas exchange means for selectively increasing and decreasing the mass of gas contained within said first working chamber (8), said gas exchange means comprising a gas exchange chamber (10) fixed with respect to said working cylinder (1);

exchange passage means extending between said first working chamber (8) and said gas exchange chamber (10);

exchange valve means (14) within said exchange passage means; and exchange operating means separated from said plunger member (3, 4) further characterized in that said gas exchange chamber (10) accommodates a pumping piston (12) movable between an innermost position adjacent said first working chamber (8) and an outermost position remote from said first working chamber (8), said pumping piston (12) defines a pumping chamber (10a) within said exchange chamber (10), said pumping chamber (10a) is adjacent said exchange valve means (14), said pumping piston (12) is provided with suction valve means (12a) permitting aspiration of air into said pumping chamber (10a) on outward movement of said pumping piston (12) and closing said pumping chamber (10) on inward movement of said pumping piston (12), said exchange valve means (14) is of the check-valve type and is closed in response to the pressure within said first working chamber (8) exceeding the pressure within said pumping chamber (10a) and is opened in response to the pressure within said pumping chamber (10a) exceeding the pressure within said first working chamber (8);

said pumping piston (12) is provided with a pump operating member (13a) outside said gas exchange chamber (10) and with an exchange valve actuating pin (16) opening said exchange valve means (14), when said pumping piston (12) is in or adjacent its innermost position; and said pumping piston (12) comprises manually operable bleed valve means (17, 18) for connecting said pumping chamber (10a) with atmosphere.

2. A gas spring as set forth in claim 1, said pumping chamber (10a) being defined within a pumping cylinder (11) fixed to one end wall (2) of said working cylinder (1).

3. A gas spring as set forth in claim 1, said bleed valve means (14, 18) comprising a bleed valve member (17), said bleed valve member (17) being connected for common movement with said gas exchange valve actuating pin (16) with respect to said pumping piston (12), said bleed valve member (17) being manually movable by a bleed valve operating member (15a) from a first closing position (FIG. 1) to a second closing position through an opening position and being biased towards said first closing position, said exchange valve actuating pin (16) opening said exchange valve means (14) when said pumping piston (12) is in a position adjacent said exchange valve means (14) and said bleed valve member (17) is in said second closing position.

4. A gas spring as set forth in claim 1, said pumping piston (12) being biased towards its outermost position.

5. A gas spring as set forth in claim 1, said gas exchange chamber (119) being a gas reservoir separated from atmosphere.

6. A gas spring as set forth in claim 1, said gas spring being accommodated within a stilt member (27).

7. A gas spring as set forth in claim 6, said gas spring comprising a piston rod member (3) extending beyond a tubular part (28) of said stilt member (27), said piston rod member (3) being surrounded by a bellows (32).

8. A gas spring as set forth in claim 6, said stilt member (27) being provided with at least one recess (33) granting passage to at least one operating member (34, 35) of said gas exchange means.

9. A gas spring comprising:

a working cylinder (1) having an axis and define a cavity (8, 9) therein;

a plunger member (3, 4) extending inwardly and outwardly of said cavity (8, 9) and defining a first working chamber (8) within said cavity (8, 9), said plunger member (3, 4) being axially movable with respect to said working cylinder (1) inwardly and outwardly of said cavity (8, 9);

a mass of gas within said first working chamber (8), the pressure of said gas being responsive to the axial position of said plunger member (3, 4) with respect to said working cylinder (1);

gas exchange means for selectively increasing and decreasing the mass of gas contained within said first working chamber (8), said gas exchange means comprising a gas exchange chamber providing a gas reservoir (119) in the cavity separated from the atmosphere and from the first working chamber (108) by a separating piston (121), exchange passage means (123) extending between said first working chamber (8) and the gas reservoir (119) through said separating piston (121), and exchange valve means (120) within said exchange passage means located adjacent said separating piston.

10. A gas spring as set forth in claim 9, said exchange valve means (120) being actuated by an operating pin (115) guided within a tubular guiding member (124) extending along said gas exchange chamber (119) between said separating piston (121) and an end wall (102) of said gas exchange chamber (119) remote from said sepataing piston (121).

11. A gas spring as set forth in claim 9, said tubular guiding member (224) being fastened to said separating piston (221) and being adjustable with respect to said end wall (202) such as to vary the volume ratio between said first working chamber (208) and said gas exchange chamber (219).

* * * * *